(12) United States Patent
Drader

(10) Patent No.: US 6,302,309 B1
(45) Date of Patent: Oct. 16, 2001

(54) FORWARDING A ROD FOR USE IN WELDING BY HIGH PRESSURE INJECTION

(76) Inventor: Clarence H. Drader, 52073 Highway 2, Sherwood Park, Alberta (CA), T8B 1J4

(*) Notice: Subject to any disclaimer, the term of this patent is extended or adjusted under 35 U.S.C. 154(b) by 0 days.

(21) Appl. No.: 09/595,444

(22) Filed: Jun. 16, 2000

(51) Int. Cl.$^7$ .............. B65H 20/00; B67D 5/62; B66D 1/30
(52) U.S. Cl. .............. 226/193; 222/146.5; 242/615.3; 254/374
(58) Field of Search .............. 226/53, 190, 193; 222/146.5; 254/333, 374; 242/615.3

(56) References Cited

U.S. PATENT DOCUMENTS

| | | | |
|---|---|---|---|
| 2,802,636 | * | 8/1957 | Sandford .............. 254/333 |
| 3,250,453 | * | 5/1966 | Halstead .............. 226/52 |
| 3,281,576 | * | 10/1966 | Cooper et al. .............. 222/146.5 X |
| 3,285,475 | * | 11/1966 | Phillips .............. 222/146.1 |
| 3,604,597 | * | 9/1971 | Pohl .............. 222/146.5 |
| 4,205,871 | * | 6/1980 | Manabe et al. .............. 254/333 |
| 4,711,746 | | 12/1987 | Drader . |
| 4,781,482 | * | 11/1988 | Ursprung .............. 222/146.5 X |
| 4,938,388 | * | 7/1990 | Yeh .............. 222/146.5 |
| 4,953,755 | * | 9/1990 | Dennison .............. 222/146.5 |
| 5,782,394 | * | 7/1998 | Langley .............. 226/187 |
| 5,971,212 | | 10/1999 | Drader . |

* cited by examiner

Primary Examiner—Michael R. Mansen
(74) Attorney, Agent, or Firm—Adrian D. Battison; Michael R. Williams; Ryan W. Dupuis

(57) ABSTRACT

A feeding device is provided for forwarding a pliable thermoplastic rod into a heated pressure chamber for extrusion through an outlet nozzle to effect thermoplastic welding. The device includes a block with a machined channel through the block including an arcuate inlet portion for receiving the pliable rod and a tubular outlet portion dimensioned to closely surround the rod to prevent buckling of the rod for ejecting the pliable rod under longitudinal force into the chamber. A rotatable drive disk has an outer serrated cylindrical surface engaging one side of the rod in the arcuate inlet portion so that the rod is pinched by a counteracting surface portion in the channel in opposition to the contacting portion of the disk whereby angular movement of the disk around the disk axis acts to forward the rod along its length along the channel. The disk sits in a slot cut in the block with the channel at the bottom of the slot with the same width as the slot.

19 Claims, 4 Drawing Sheets

020250154

FORWARDING A ROD FOR USE IN WELDING BY HIGH PRESSURE INJECTION

This invention relates to an apparatus for forwarding a rod which is primarily but not exclusively designed for use in an arrangement for thermoplastic welding using high pressure injection.

BACKGROUND OF THE INVENTION

In U.S. Pat. No. 4,711,746 issued Dec. 8$^{th}$, 1987, the present inventor disclosed a device for forming a thermoplastic weld between two plastic parts in which a thermoplastic material is forced into a chamber and melted within the chamber so as to generate a molten plastic material under a pressure of at least 1000 psi and more preferably of the order of 2500 psi. The molten plastic is expelled through an orifice so that the molten plastic under pressure from the heating chamber is forced into the space between two plastic components to effect a weld therebetween. It will be appreciated that the pressure set forth above is orders of magnitude higher than the pressure necessary for a conventional simple glue gun in which a hot melt adhesive is expelled simply under low or zero pressure.

The thermoplastic welding system disclosed in the above patent has achieved considerable commercial success. However in order to successfully operate the device it is necessary to inject into the heating chamber a thin rod or wire of the thermoplastic material so that the pressure generated within the chamber is obtained by forcing the rod into the chamber with a longitudinal force which is sufficient to generate the required pressure. The thermoplastic material in rod form generally has a diameter of the order of one sixteenth to one quarter inch and more preferably of the order of one eighth inch. This relatively small diameter reduces the longitudinal force necessary on the rod to generate the required pressure but makes the rod more pliable and difficult to feed.

The original patent disclosed a technique for feeding the rod in which the rod passes between two feeding disks with the rod tangential to each of the disks and lying in a common plane with the disks. Each disk has a groove in its outer periphery so as to attempt to trap the cylindrical rod between the rollers. However in practice this arrangement was ineffective and was replaced by a reciprocating clamping arrangement which acted to feed or stuff the pliable rod into the tube leading to the chamber. This device using the reciprocating clamp arrangement has achieved commercial success, but the rod feed has remained a source of concern and potential problem in that it is relatively expensive, complex and prone to breakdown.

Attempts have been made to replace the reciprocating clamp of the commercial embodiment and one attempt is set forth in U.S. Pat. No. 5,971,212 of the present inventor which is issued Oct. 26$^{th}$, 1999. This device provides a friction block on one side of the rod which reciprocates back and forth so as to feed the rod forwardly along a channel. The use of the reciprocating drive arrangement however requires a component to prevent reverse movement of the rod when the reciprocating device reverses to commence a further feeding stroke. This device unfortunately has failed to overcome the above problems and has not been adopted.

SUMMARY OF THE INVENTION

It is one object of the present invention to provide an improved apparatus for driving a pliable rod longitudinally under sufficient force to generate significant pressure in the rod.

According to the present invention there is provided an apparatus for forwarding a pliable rod comprising:
 a housing;
 a channel through the housing including an inlet portion for receiving the pliable rod and an outlet portion for ejecting the pliable rod under longitudinal force;
 at least the outlet portion forming a tubular closed surface surrounding the rod and dimensioned to closely surround the rod to prevent buckling of the rod when forwarded under longitudinal force into the outlet portion;
 a drive disk rotatable about an axis of the disk for forwarding the rod from the inlet portion into the outlet portion, the disk having an outer cylindrical surface surrounding the axis for engaging one side of the rod;
 the disk and the channel being arranged such that the channel lies in a radial plane of the axis of the disk;
 the disk and the channel being arranged such that a contact portion of the outer cylindrical surface extends along and defines one side of the channel;
 and a counteracting surface portion in the channel in opposition to the contacting portion of the disk arranged such that the rod in the channel is pinched between the contacting portion of the disk and the counteracting surface portion whereby angular movement of the disk around the disk axis acts to forward the rod along its length along the channel.

The term disk as used herein is not intended to imply any particular structure of the member except that it has an axis and a peripheral surface around which the surface rotates. Normally the disk will be relatively narrow so that its diameter is greater than its width and its width is relatively small to match that of the rod, but these dimensions are not essential to the invention.

Preferably the counteracting surface portion is formed by a stationary surface of the channel. However in alternative arrangements, the counteracting surface may be formed on another member inserted into the channel and even may be another similar opposing disk.

Preferably the counteracting surface portion of the channel is arcuate so as to lie on a circle surrounding the disk axis so that the rod is pinched by the surface of the disk and the arcuate surface portion as it is carried around the arcuate surface portion by movement of the disk. This ensures that the disk has contact over an extended arc preferably as much as 90 degrees to provide enough grip to ensure driving without slip.

Preferably the housing includes a slot therein for receiving at least a part of the disk, the slot having two parallel sides each lying closely adjacent a respective side of the disk such that the outer cylindrical surface of the disk projects into the slot, the channel being arranged at the slot adjacent the outer cylindrical surface of the disk.

Preferably the channel has a width substantially equal to the width of the slot so as to have sides contiguous with the sides of the slot. Thus the disk which closely matches the shape of the slot has a width matching that of the channel which is approximately equal to the width of the rod.

Preferably the disk has transverse, angularly spaced serrated edges thereon for engaging the rod and driving the rod.

Preferably the tubular closed surface forming the outlet portion commences at a position immediately adjacent the outer cylindrical surface of the disk such that the rod as it leaves the outer surface of the disk forwarded thereby immediately enters the tubular closed surface and is confined thereby to prevent buckling under the longitudinal forces on the rod.

Preferably the outlet portion is tangential to the outer surface of the disk.

Preferably the channel and the tubular portion are integrally and contiguously formed in an integral structure forming the housing.

Preferably the inlet portion of the channel has one side thereof defined by the outer surface of the disk.

Preferably the counteracting surface portion extends around an angle of the order of 90 degrees of the disk.

Preferably the outlet portion of the channel is connected to a chamber into which the rod is fed under the longitudinal force, the chamber having a heating element for effecting melting of the rod such that the melted rod in the chamber is under a pressure from the forwarding of the rod and wherein there is provided a discharge nozzle connected to the chamber for receiving the melted rod therefrom through which the melted rod is forced by the pressure for effecting a thermoplastic welding action. However the rod forwarding device disclosed herein can be used for other end uses and the thermoplastic welding technique disclosed herein is only one example.

BRIEF DESCRIPTION OF THE DRAWINGS

In the accompanying drawings, which illustrate an exemplary embodiment of the present invention.

DETAILED DESCRIPTION

Figure 1:
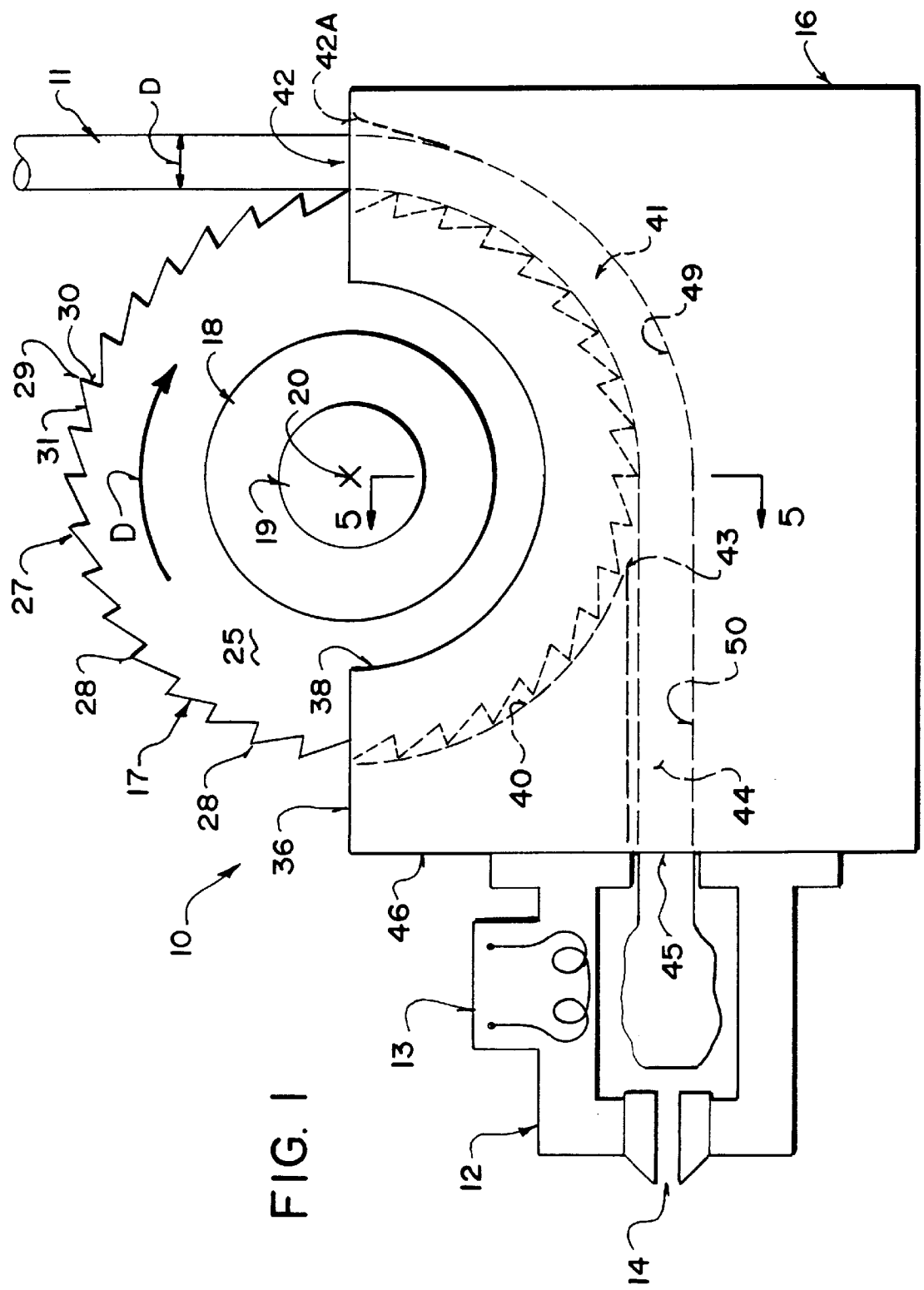
FIG. 1 is a vertical cross sectional view of the apparatus according to the present invention.
Figure 2:
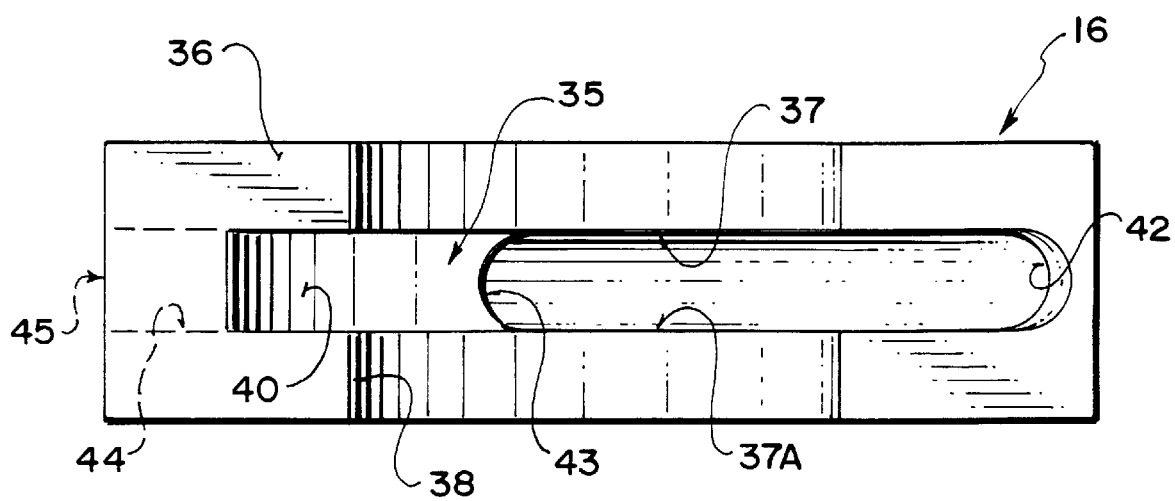
FIG. 2 is a top plan view of the drive block only of the apparatus of FIG. 1.
Figure 3:
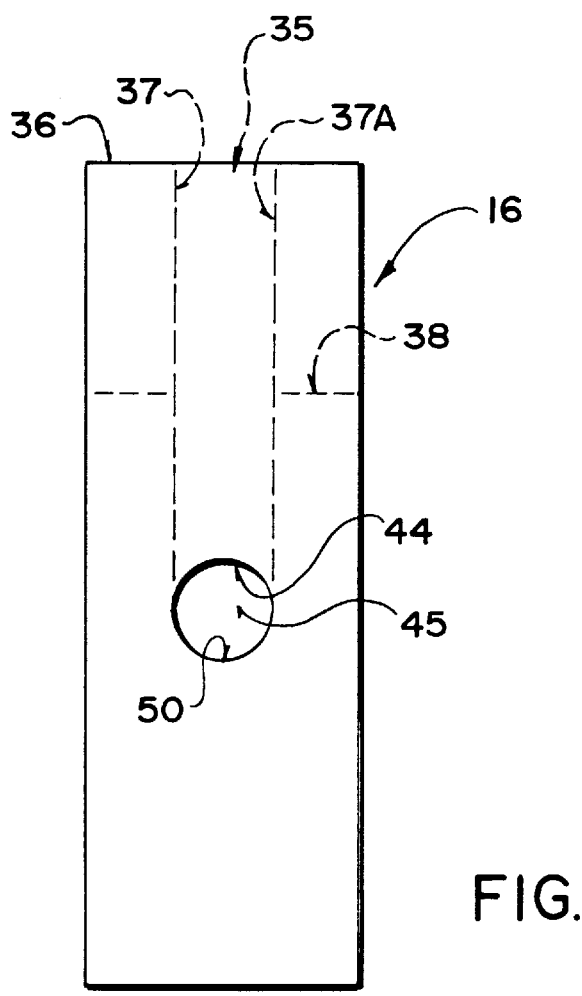
FIG. 3 is a front elevational view of the drive block only of the apparatus of FIG. 1.

The apparatus comprises a device 10 for forwarding a pliable rod 11 of a thermoplastic material so that the rod can be forced into a chamber 12 where the longitudinal force on the rod generates a pressure within the chamber. The chamber is heated by a heating element 13 so that the thermoplastic material of the rod is melted within the chamber so as to form a mass of the thermoplastic material under the pressure generated by the longitudinal force on the rod. The chamber is connected to an outlet nozzle 14 to which the molten thermoplastic material from the chamber is ejected under the pressure within the chamber so as to effect thermoplastic welding as described in the above patents. The chamber, the heating element and the nozzle are shown only schematically since these are readily available to one skilled in the arts from the above patents and from products manufactured and sold in accordance with the above patents.

The rod feeding device 10 comprises a block 16 and a drive disk 17. The drive disk 17 is mounted on a hub 18 attached to a shaft 19 for rotation of the disk about the axis 20 of the shaft. The shaft 19 is carried in bearing blocks 21 and 22 carried on suitable support elements 23 and 24 each attached or carried on a respective side of the main block 16. Suitable arrangements of the bearing blocks and the supports therefor are again well known to one skilled in the arts so that further detail is not necessary here. The hub 18 maintains the disk 17 fixed in a radial plane of the axis 20.

Disk 17 includes two side surfaces 25 and 26 which are parallel and lie in radial planes of the axis 20. The disk further includes an outer surface 27 lying generally on a cylinder surrounding the axis 20 so that the peripheral surface has a constant radius from the axis 20 around its full extent. The peripheral surface is serrated with teeth 28 defining an apex 29 formed by two side surfaces 30 and 31. The apex 29 thus forms a leading edge which tends to bite into the rod and forward the rod when the disk is rotated in the clockwise direction D. The shaft 19 is driven in rotation in the direction D by a drive 32.

The block 16 has a slot 35 machined into the block from a top surface 36 of the block so as to receive the lower half of the disk 17. The slot 35 has side walls 37 and 37A which are spaced by the width of the peripheral surface 27 so that the sides of the disk lie closely adjacent or in sliding contact with the sides of the slot.

Figure 4:
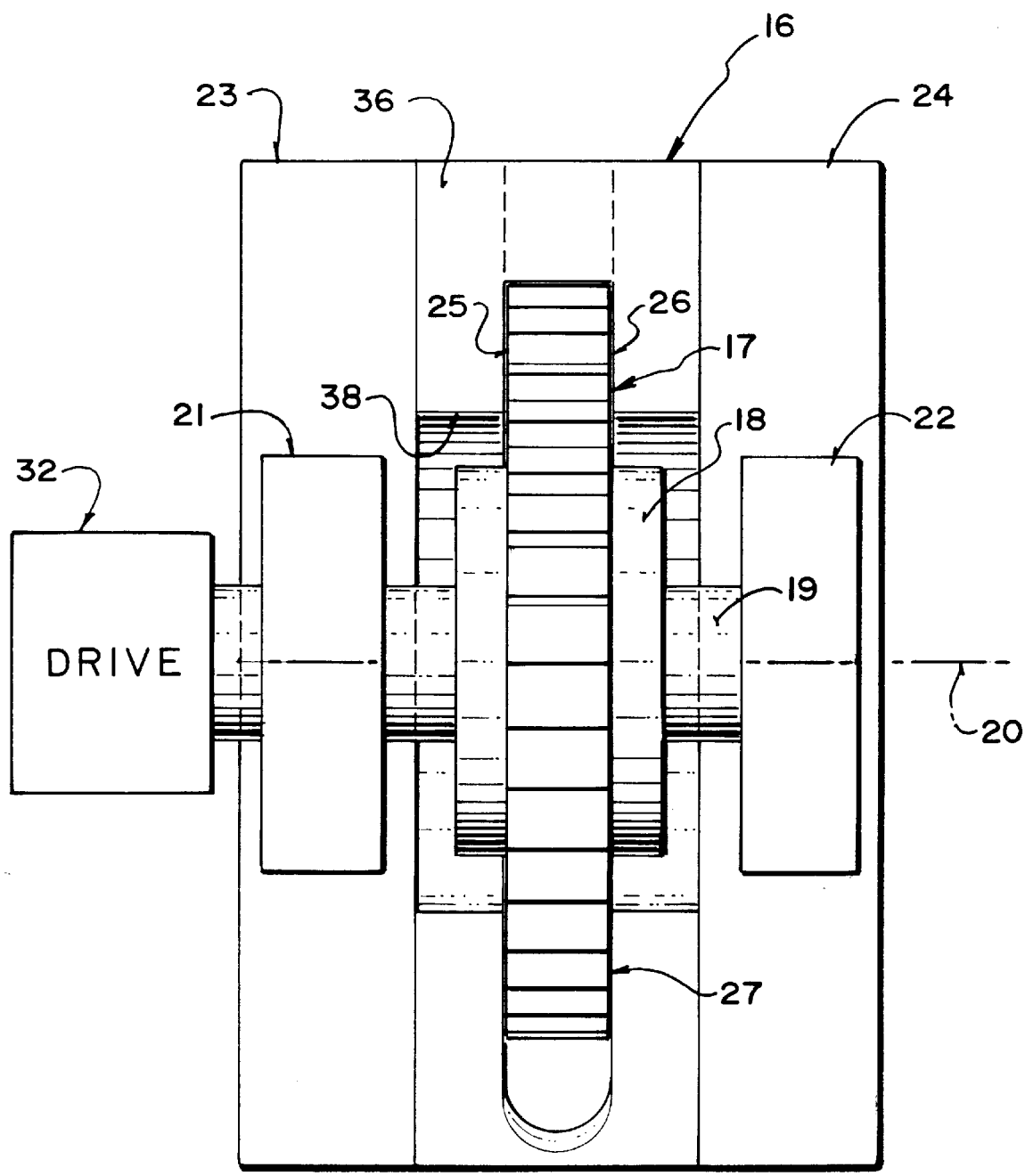
FIG. 4 is a top plan view of the apparatus of FIG. 1 with the heating chamber and extrusion nozzle omitted.

The top surface 36 is recessed across its width to form a receptacle 38 in the shape of a semi-cylindrical cut out portion which crosses the slot 35 and forms a receptacle for the requires the receptacle 38 to allow one half of the disk including one half of the hub to be received within the block The shaft 19 projects outwardly to each side of the receptacle 38 as shown in FIG. 4.

Figure 5:
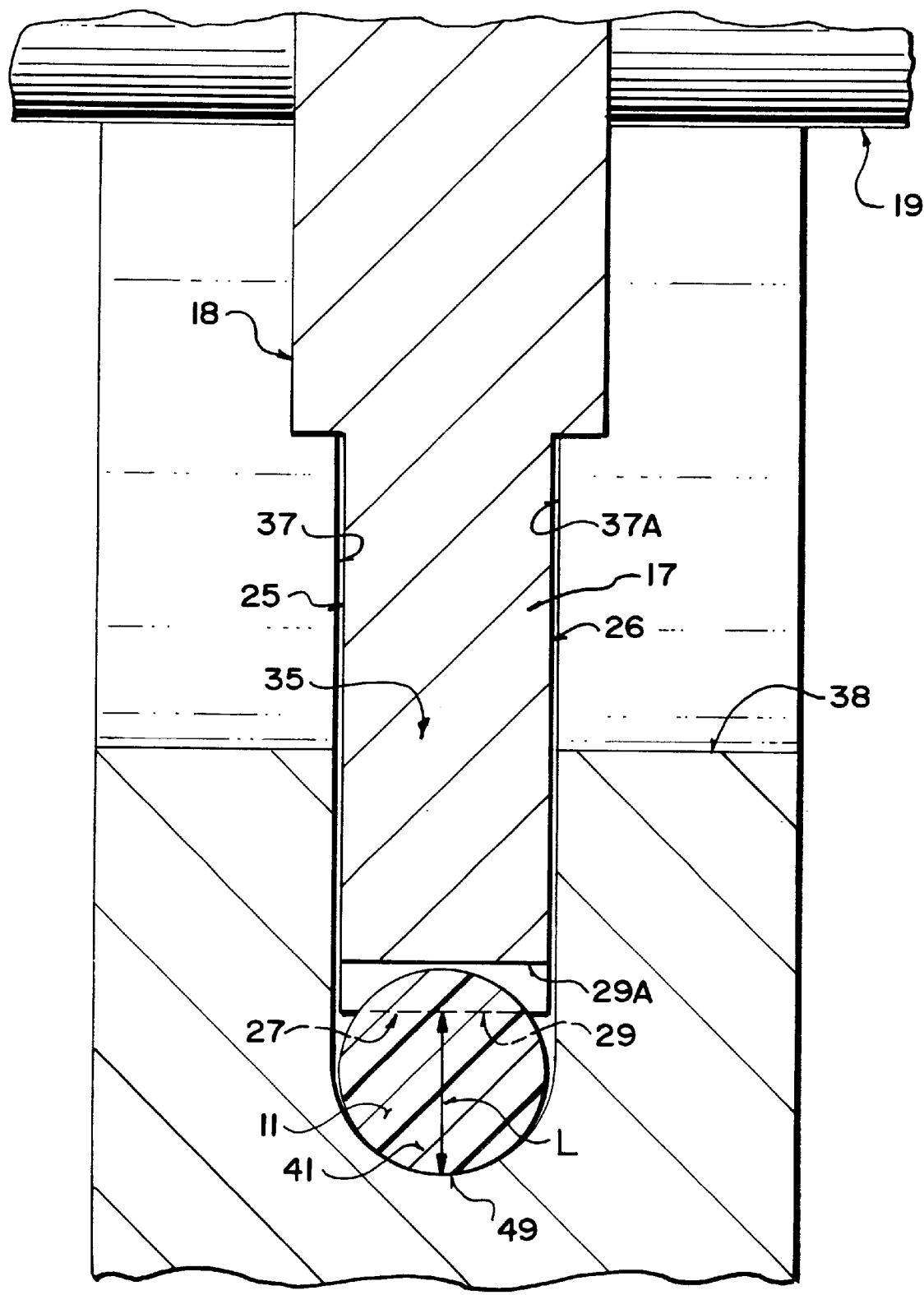
FIG. 5 is a cross sectional view along the lines of 5—5 of FIG. 1 on an enlarged scale.

As best shown in FIG. 5, the peripheral surface 27 and particularly the leading edge 29 and the trailing recess 29A are straight and parallel to the axis 20. However these may also be concave to better grasp the convex outer surface of the rod.

The slot 35 has a bottom surface generally following the peripheral surface 27. Thus a first portion of the slot indicated at 40 lies immediately adjacent the peripheral surface 27 so that the leading edges 29 pass immediately adjacent the first portion 40 of the bottom of the slot. Thus the first portion 40 is arcuate and has a radius which is constant spaced from the axis twenty.

A second portion of the slot is arranged to be deeper than the first portion 40 and thus defines a channel at the bottom of the slot and surrounding one part of the disk 17. The portion of the slot forming the channel is indicated at 41 and commences at the surface 36 and an inlet 42 of the channel and terminates at an edge 43 at the bottom of the portion 40. This portion 41 thus defines a first portion of a channel commencing at the inlet 42 with the second portion of the channel defined by a bore 44 commencing at the edge 43 and extending from the first portion 41 of the channel through to an exit 45 of the bore at an end wall 46 of the block which is attached to the chamber 12. The exit 45 of the bore thus defines an exit mouth for the channel through which the rod is forced by the drive motion of the disk.

The bore 44 is cylindrical with a generally circular cross section closely matching the diameter of the rod 11. A small clearance may be provided around the outside of the rod within the bore 44 so as to prevent jamming of the rod within the bore. However the bore 44 is dimensioned to prevent buckling of the rod and a longitudinal forces from the disk prior to the rod being forced into the chamber 12.

The portion 41 of the channel is thus formed integrally with the slot and in effect forms an outer portion of the slot. As shown in FIG. 5, the bottom of the slot is circular in cross section as indicated at 49 so as to match the cylindrical cross section of the rod thus allowing the rod to slide over the bottom surface of the slot within the channel.

The depth of the channel at the bottom of the slot is arranged so that the spacing between the leading edges 29 and the bottom of the slot 49 as indicated by the dimension L is slightly less than the diameter D of the rod.

The width of the slot is equal to the width of the channel so that the side walls 37 and 38 of the slot smoothly converge into the bottom surface 49 of the slot at the channel. Similarly the width of the disk 17 is substantially equal to the width of the slot and therefore the width of the disk is substantially equal to the diameter of the rod. Slight clearances in the dimensions may be provided so that the disk is slightly increased in width and thus the channel at the bottom of the slot is slightly greater than the diameter of the rod so as to prevent jamming when the rod is compressed by its engagement with the leading edges of the serrations on the peripheral surface of the disk.

The bottom surface 49 of the slot at the channel is arcuate with a constant distance from the axis 20 from the inlet 42 to the edge 43.

As shown in the embodiment the arcuate channel portion 41 from the inlet 42 to the edge 43 extends over approximately 90 degrees of arc. The bore 44 is arranged so that it is substantially tangential to the disk and smoothly joins with the channel portion 41 so that the surface 49 is contiguous with a bottom surface 50 of the bore.

The inlet 42 is slightly chamfered as indicated at 42A so that the surface of the chamfered section is spaced from the edges 29 by the diameter of the rod thus allowing the rod to be inserted through the chamfered section into the first channel portion to be engaged by the edges 29.

In operation, therefore, when the rod end is inserted into the first channel portion, the leading edges 29 bite into the adjacent part of the periphery of the rod due to its pliable nature and act to carry the rod in a sweeping action around the arcuate surface 49 and to insert the pliable rod into the bore 44 where it is striped from the disk by the edge 43. The disk is driven with sufficient force to inject the rod through the bore 44 into the chamber with sufficient longitudinal force on the rod to generate a pressure within the chamber of at least 1000 psi and preferably of the order of 2500 psi. The arcuate engagement of the rod with the plurality of leading edges 29 around the portion 41 is sufficient to provide a driving force along the longitudinal length of the rod as the rod is swept over the surface 49.

While the channel portion 41 is formed with a width equal to the width of the slot, it is possible that the channel may be narrower than the slot and thus narrower than the disk and formed as a counter bore section at the bottom of the slot. It is preferable that the channel has a width equal to the width of the rod.

The surface 49 is preferably a half circle so as to match the outside surface of the rod which is cylindrical but this is not essential and it is possible that the bottom surface of the channel may be flat and parallel to the edges 29 so the channel is in effect rectangular. Similarly the slot 44 may also be rectangular with its side surfaces generally tangential to the outside cylindrical surface of the rod.

The angle around which the rod engages the disk is as shown of the order of 90 degrees but this angle may be increased or decreased in order to increase or decrease as necessary the length of contact with the rod. At a minimum, the rod may indeed simply be tangential to the disk so that it is engaged only by a few of the edges 29. However it is preferred that some length of the first channel portion 41 is arcuate around the disk in order to increase the number of edges 29 in engagement with the rod.

In the embodiment shown, the peripheral surface 27 of the disk co-operates with a stationary surface at the bottom of the slot defined by the channel portion 41 this is of course the simplest arrangement available since the surface 49 is simply formed by machining a stationary block. However in order to reduce friction, it is possible that moving surfaces provided by one or more rollers may form in effect the surface 49 for co-operating with the peripheral surface of the disk in the driving action.

The bore 44 commences immediately at the disk at the edge 43 and is not spaced away from the disk so that the rod when it is under pressure has no free space between the end of the first channel portion and the bore in which it can buckle under the longitudinal force.

While one embodiment of the present invention has been described in the foregoing, it is to be understood that other embodiments are possible within the scope of the invention. The invention is to be considered limited solely by the scope of the appended claims.

What is claimed is:

1. Apparatus for forwarding a pliable rod comprising:

a housing;

a channel through the housing including an inlet portion for receiving the pliable rod and an outlet portion for ejecting the pliable rod under longitudinal force;

at least the outlet portion forming a tubular closed surface surrounding the rod and dimensioned to closely surround the rod to prevent buckling of the rod when forwarded under longitudinal force into the outlet portion;

a drive disk rotatable about an axis of the disk for forwarding the rod from the inlet portion into the outlet portion, the disk having an outer cylindrical surface surrounding the axis for engaging one side of the rod and for feeding the rod in a forwarding direction as the disk continues to rotate in a feed direction about the axis;

the disk and the channel being arranged such that the channel lies in a radial plane of the axis of the disk;

the disk and the channel being arranged such that a contact portion of the outer cylindrical surface extends along and defines one side of the channel;

and a counteracting surface portion in the channel in opposition to the contacting portion of the disk arranged such that the rod in the channel is pinched between the contacting portion of the disk and the counteracting surface portion whereby angular movement of the disk around the disk axis acts to forward the rod along its length along the channel;

wherein the counteracting surface portion of the channel is a fixed arcuate surface portion arranged to lie on a circle surrounding the disk axis so that the rod is pinched by the surface of the disk and the fixed arcuate surface portion as it is carried around the fixed arcuate surface portion by movement of the disk.

2. The apparatus according to claim 1 wherein the housing includes a slot, therein for receiving at least a part of the disk, the slot having two parallel sides each lying closely adjacent a respective side of the disk such that the outer cylindrical surface of the disk projects into the slot, the channel being arranged at the slot adjacent the outer cylindrical surface of the disk.

3. The apparatus according to claim 2 wherein the channel has a width substantially equal to the width of the slot so as to have sides contiguous with the sides of the slot.

4. The apparatus according to claim 1 wherein the disk has transverse, angularly spaced serrated edges thereon for engaging the rod and driving the rod.

5. The apparatus according to claim 1 wherein the tubular closed surface forming the outlet portion commences at a position immediately adjacent the outer cylindrical surface of the disk such that the rod as it leaves the outer surface of the disk forwarded thereby immediately enters the tubular closed surface and is confined thereby.

6. The apparatus according to claim 5 wherein the outlet portion is tangential to the outer surface of the disk.

7. The apparatus according to claim 1 wherein the channel and the tubular portion are integrally formed in an integral structure forming the housing.

8. The apparatus according to claim 1 wherein the counteracting surface portion of the channel is part circular in cross-section so as to closely surround a cylindrical surface of the rod.

9. The apparatus according to claim 1 wherein the inlet portion of the channel has one side thereof defined by the outer surface of the disk.

10. The apparatus according to claim 1 wherein the counteracting surface portion extends around an angle of the order of 90 degrees of the disk.

11. Apparatus for forwarding a pliable rod comprising:

a channel including an inlet portion for receiving the pliable rod and an outlet portion for ejecting the pliable rod under longitudinal force;

a drive disk rotatable about an axis of the disk for forwarding the rod from the inlet portion into the outlet portion, the disk having an outer cylindrical surface surrounding the axis for engaging one side of the rod and for feeding the rod in a forwarding direction as the disk continues to rotate in a feed direction about the axis;

the disk and the channel being arranged such that the channel lies in a radial plane of the axis of the disk;

the disk and the channel being arranged such that a contact portion of the outer cylindrical surface of the disk extends along and defines one side of the channel;

and a stationary surface portion in the channel being arranged in opposition to the contacting portion of the disk, the stationary surface portion being arcuate so as to lie on a circle surrounding the disk axis so that the rod is pinched by the surface of the disk and the arcuate surface portion as it is carried around the arcuate surface portion by movement of the disk whereby angular movement of the disk around the disk axis acts to forward the rod along its length along the channel.

12. An apparatus for thermoplastic welding using a pliable plastics rod comprising:

a channel including an inlet portion for receiving the pliable rod and an outlet portion for ejecting the pliable rod under longitudinal force;

a drive disk rotatable about an axis of the disk for forwarding the rod from the inlet portion into the outlet portion, the disk having an outer cylindrical surface surrounding the axis for engaging one side of the rod and for feeding the rod in a forwarding direction as the disk continues to rotate in a feed direction about the axis;

the disk and the channel being arranged such that the channel lies in a radial plane of the axis of the disk;

the disk and the channel being arranged such that a contact portion of the outer cylindrical surface of the disk extends along and defines one side of the channel;

a stationary surface portion in the channel being arranged in opposition to the contacting portion of the disk, the stationary surface portion being arcuate so as to lie on a circle surrounding the disk axis so that the rod is pinched by the surface of the disk and the arcuate surface portion as it is carried around the arcuate surface portion by movement of the disk whereby angular movement of the disk around the disk axis acts to forward the rod along its length along the channel;

a chamber;

the outlet portion of the channel being connected to the chamber into which the rod is fed under the longitudinal force;

the chamber having a heating element for effecting melting of the rod such that the melted rod in the chamber is under a pressure from the forwarding of the rod;

and a discharge nozzle connected to the chamber for receiving the melted rod therefrom the discharge nozzle being arranged such that the melted rod is forced by the pressure through the discharge nozzle;

the disk and the channel being arranged such that the pressure is sufficiently high for effecting a thermoplastic welding action.

13. The apparatus according to claim 12 wherein the disk is mounted in a housing which includes a slot therein for receiving at least a part of the disk, the slot having two parallel sides each lying closely adjacent a respective side of the disk such that the outer cylindrical surface of the disk projects into the slot, the channel being arranged in the housing at the slot adjacent the outer cylindrical surface of the disk.

14. The apparatus according to claim 13 wherein the channel has a width substantially equal to the width of the slot so as to have sides contiguous with the sides of the slot.

15. The apparatus according to claim 13 wherein at least the outlet portion of the channel forms a tubular dosed surface surrounding the rod and dimensioned to closely surround the rod to prevent buckling of the rod when forwarded under longitudinal force into the outlet portion, the tubular closed surface commencing at a position immediately adjacent the outer cylindrical surface of the disk such that the rod as it leaves the outer surface of the disk forwarded thereby immediately enters the tubular closed surface and is confined thereby.

16. The apparatus according to claim 15 wherein the outlet portion is tangential to the outer surface of the disk.

17. The apparatus according to claim 12 wherein the disk has transverse, angularly spaced serrated edges thereon for engaging the rod and driving the rod.

18. The apparatus according to claim 12 wherein the counteracting surface portion of the channel is part circular in cross-section so as to closely surround a cylindrical surface of the rod.

19. The apparatus according to claim 12 wherein the counteracting surface portion extends around an angle of the order of 90 degrees of the disk.

\* \* \* \* \*